United States Patent [19]

Beecher

[11] Patent Number: 4,610,275

[45] Date of Patent: Sep. 9, 1986

[54] VALVE FOR RELIEVING PRESSURE OR CHECKING REVERSE FLOW

[76] Inventor: William H. Beecher, 292 Boyd Ave., Elmhurst, Ill. 60126

[21] Appl. No.: 794,517

[22] Filed: Nov. 4, 1985

[51] Int. Cl.[4] ............................................. F16K 15/14
[52] U.S. Cl. .................................................... 137/854
[58] Field of Search ................................ 137/852, 854

[56] References Cited

U.S. PATENT DOCUMENTS

| | | | |
|---|---|---|---|
| 3,626,978 | 12/1971 | Hoekstra | 137/854 |
| 3,633,613 | 1/1972 | Julow | 137/854 X |
| 3,990,439 | 11/1976 | Klinger | 137/854 X |
| 4,360,326 | 11/1982 | Buchholz et al. | 137/854 X |
| 4,369,812 | 1/1983 | Paradis et al. | |
| 4,415,003 | 11/1983 | Paradis et al. | |
| 4,485,900 | 12/1984 | Kato et al. | |
| 4,507,059 | 3/1985 | Kobayashi et al. | |
| 4,538,508 | 9/1985 | Ballard | 137/854 X |

FOREIGN PATENT DOCUMENTS 1600614 10/1981 United Kingdom ................ 137/854

*Primary Examiner*—Robert G. Nilson
*Attorney, Agent, or Firm*—Burmeister, York, Palmatier, Hamby & Jones

[57] ABSTRACT

A flexible resilient valve disc is mounted in a valve body and is biased by its own resilience against an annular valve seat surrounding an inlet cavity in an inlet body member. The valve disc is adapted to be deflected away from the valve seat into an outlet chamber and an outlet body member. Mating pin and socket formations are formed axially on the body member. The valve disc has a central mounting hole which is received with an interference fit on the pin formation. Initially, the disc is flat, but is deflected into a cupped shape by engagement with the valve seat, when the valve members are assembled and bonded together. The inlet and outlet body members have inlet and outlet connections with inlet and outlet passages therein. The inlet and outlet connections are offset in a radially outward direction from the central axis of the valve. This offset construction simplifies the molding of the body members and makes it easier for the valve disc to crack open due to surges of differential pressure between the inlet and outlet passages. Stop pins are provided on the outlet member to prevent the valve disc from obstructing the outlet passage. The inlet and outlet connections are aligned with each other and merge smoothly with the body members to provide a short flow path and to avoid turbulence in the fluid flow.

14 Claims, 5 Drawing Figures

VALVE FOR RELIEVING PRESSURE OR CHECKING REVERSE FLOW

FIELD OF THE INVENTION

This invention relates to a valve which will function as a pressure relief valve, a vacuum relief valve or a check valve to prevent reverse flow of a fluid.

BACKGROUND OF THE INVENTION

There is a considerable need for small, inexpensive yet highly efficient valves, adapted to function as pressure relief valves, vacuum relief valves or check valves, to prevent reverse fluid flow. For example, there are many applications for such valves in the medical field. Specifically, such valves are employed in intravenous fluid supply systems.

In many applications, it is necessary that the valve have a low cracking pressure, in that the valve will be operated between its closed and open positions by a low pressure differential. For such applications, certain disc-type valves have been produced, in which the movable valve member is in the form of a thin disc. However, problems have been encountered with such disc-type valves, in that they have been difficult to assemble and somewhat unreliable in operation. The assembly difficulties have led to high reject rates in that a rather high percentage of the assembled valves has been defective, so that it has been necessary to discard the defective valves.

SUMMARY OF THE INVENTION

One object of the present invention is to provide a new and improved disc-type valve, adapted to be used as a pressure relief valve, a vacuum relief valve or a check valve, which affords a low cracking pressure and is easy to assemble, effective and reliable in operation, and inexpensive to manufacture.

To achieve this and other objects, the present invention provides a valve for relieving pressure or checking reverse flow, such valve comprising a valve body including first and second mating body members which are generally circular in cross-section, the first body member having an inlet cavity with an annular valve seat surrounding the cavity, the body members having mating pin and socket formations disposed axially thereon, a flexible resilient valve disc having a central opening for sealingly receiving the pin formation whereby the pin formation retains the valve disc, the valve disc having an outer portion which initially is in sealing engagement with the annular valve seat, the body members having annular shoulder means around the pin and socket formations for engaging the valve disc, the annular shoulder means being recessed into the inlet cavity for deflecting the valve disc into a cupped shape whereby the central portion of the valve disc is deflected into the inlet cavity while the outer portion of the valve disc is resiliently biased against the annular valve seat, the second body member having an outlet chamber therein for receiving the valve disc, a tubular inlet connection on the first body member and forming an inlet passage communicating with the inlet cavity, the tubular inlet connection being offset in a radially outward direction from the axial pin and socket formations, and a tubular outlet connection on the second body member and forming an outlet passage communicating with the outlet chamber, the tubular outlet connection being offset in a radially outward direction from the axial pin and socket formations and being aligned with the tubular inlet connection, the flexible resilient disc being resiliently flexible away from the annular valve seat and into the outlet chamber by differential fluid pressure between the inlet cavity and the outlet chamber.

The valve preferably includes pin elements or other stop means on the second body member and projecting into the outlet chamber toward the valve disc for arresting the deflection of the valve disc to prevent the valve disc from obstructing the outlet passage.

The valve disc is preferably made of a thin silicone elastomer material, although other suitable materials may be employed.

The central opening in the valve disc is preferably of a size to establish an interference fit with the pin formation, whereby the valve disc is securely retained on the pin formation during assembly of the valve. The interference fit also assures a tight seal between the pin formation and the valve disc.

The inlet cavity preferably has a shallow configuration such that it supports the valve disc when back pressure is applied to the valve, so that the valve disc will not herniate, but will remain in sealing engagement with the valve seat.

The body members are preferably made of resinous plastic materials which are bonded together, preferably by an ultrasonically formed weld.

The pin formation is preferably on the second body member which includes the outlet chamber. The socket formation is preferably on the first body member, which includes the inlet cavity. The annular shoulder means may include oppositely facing annular shoulders disposed around the pin formation and the socket formation and engaging opposite sides of the valve disc.

It is highly advantageous to arrange the tubular inlet and outlet connections so that they are offset in a radially outward direction from the axial pin and socket formations. With this construction, the inlet and outlet passages are opposite the outer portion of the valve disc, in one particular location around the circumference of this disc, so that the valve disc cracks open more easily in response to any surge of differential pressure between the inlet and outlet passages. The valve disc starts to unseat or crack open from the valve seal in the location which is opposite the inlet and outlet passages. As the flow increases through the valve, the entire valve disc is unseated from the valve seat.

The offset positioning of the aligned inlet and outlet connections provides a short flow path therebetween. Moreover the outlet connection merges smoothly with the outlet chamber to afford a smooth channel which avoids turbulence in the fluid flow.

Furthermore, the offset positioning of the inlet and outlet connections facilitates the molding of the body members, because the construction of the mold is simplified by offsetting the inlet and outlet connections from the pin and socket formations. The construction of the body members is actually simpler when the inlet and outlet connections are offset from the pin and socket formations.

BRIEF DESCRIPTION OF THE DRAWINGS

Further objects, advantages and features of the present invention will appear from the following description, taken with the accompanying drawings, in which.

DETAILED DESCRIPTION OF AN ILLUSTRATIVE EMBODIMENT

Figure 1:
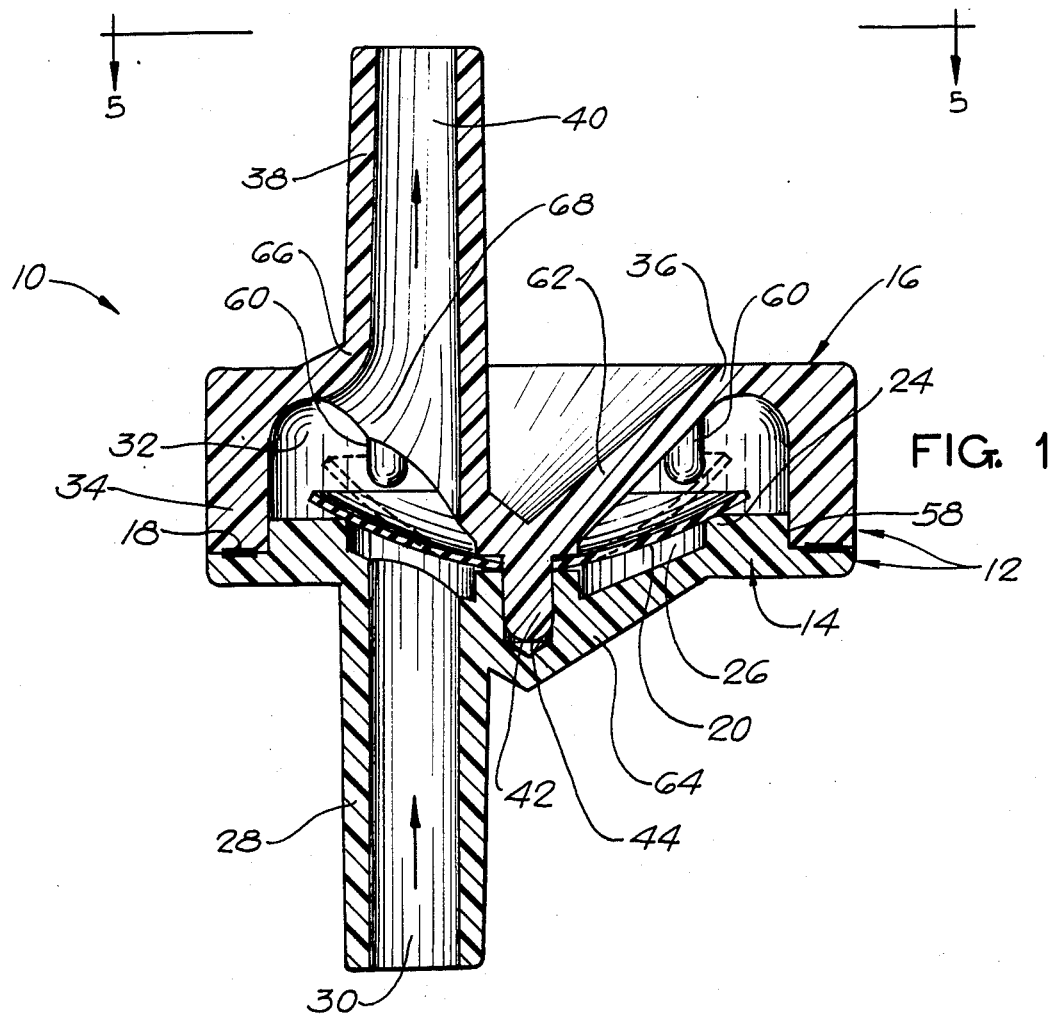
FIG. 1 is a greatly enlarged central longitudinal section, taken through a valve to be described as an illustrative embodiment of the present invention.

As just indicated, the drawings illustrate a valve 10, adapted to serve as a pressure relief valve, for relieving fluid pressure; a vacuum relief valve; or a check valve, adapted to prevent the reverse flow of a fluid. The entire valve 10 is shown on a greatly enlarged scale in FIG. 1. Typically, the valve 10 is miniature in size, having a diameter of only about $\frac{5}{8}''$ (15.875 millimeters), for example.

The illustrative valve 10 has a valve body or casing 12, comprising an inlet body member 14 and an outlet body member 16, both made of any known or suitable resinous plastic material which may be intricately molded. The inlet and outlet body members 14 and 16 are suitably bonded bogether, as by means of an ultrasonically formed weld 18. The valve 10 has only one other component: a flexible resilient valve disc 20, made of some form of rubber or a rubber-like material, such as a silicone elastomer material.

In the initial condition of the assembled valve 10, the valve disc 20 is biased by its own elasticity into its closed position, as shown in full lines in FIG. 1. When a fluid is flowing through the valve 10, the valve disc 20 is deflected into its open position, as shown in broken lines in FIG. 1.

Figure 4:
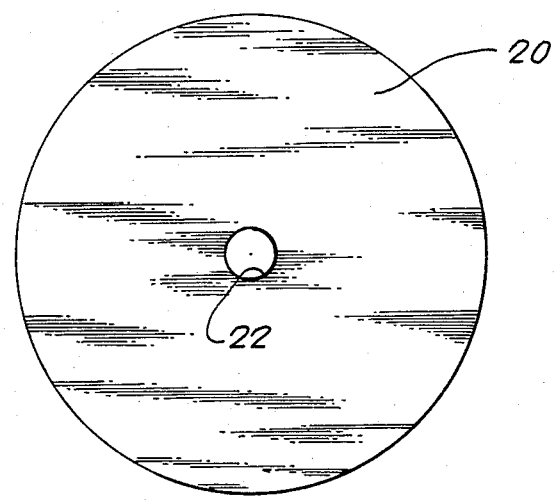
FIG. 4 is a plan view of the valve disc, shown in its free state, in which the disc is flat.
Figure 5:
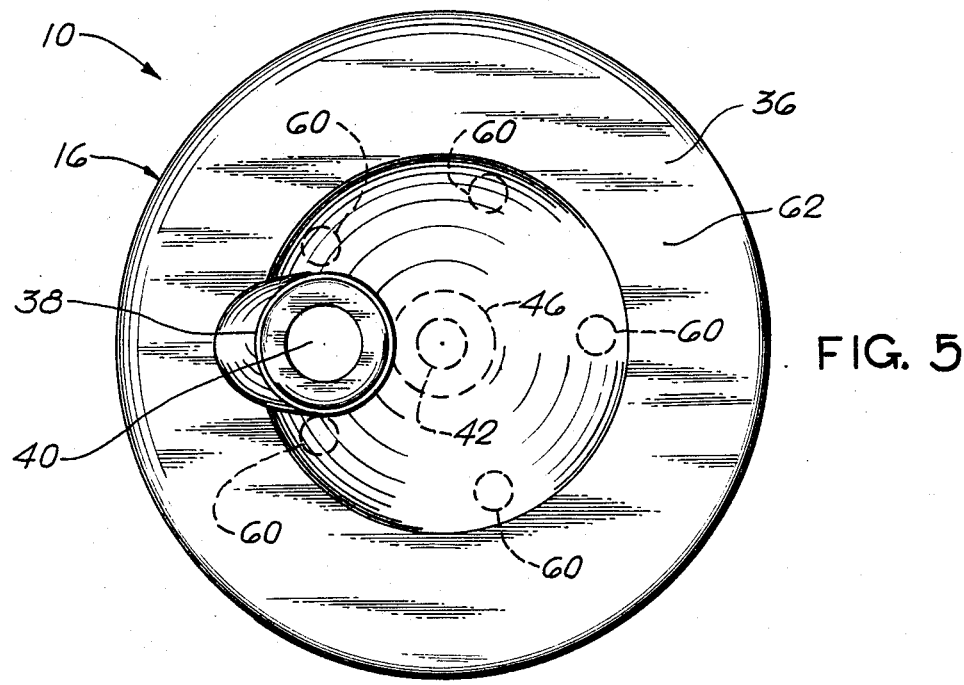
FIG. 5 is an end view of the upper valve member, taken as indicated by the line 5—5 in FIG. 1.

FIG. 4 shows the valve disc 20 in its free state, in which the valve disc is simply a thin, flat circular disc, having a central mounting hole or opening 22. The valve 10 and its body members 14 and 16 are substantially circular in cross-sectional shape, as will be evident from the drawings.

Figure 3:
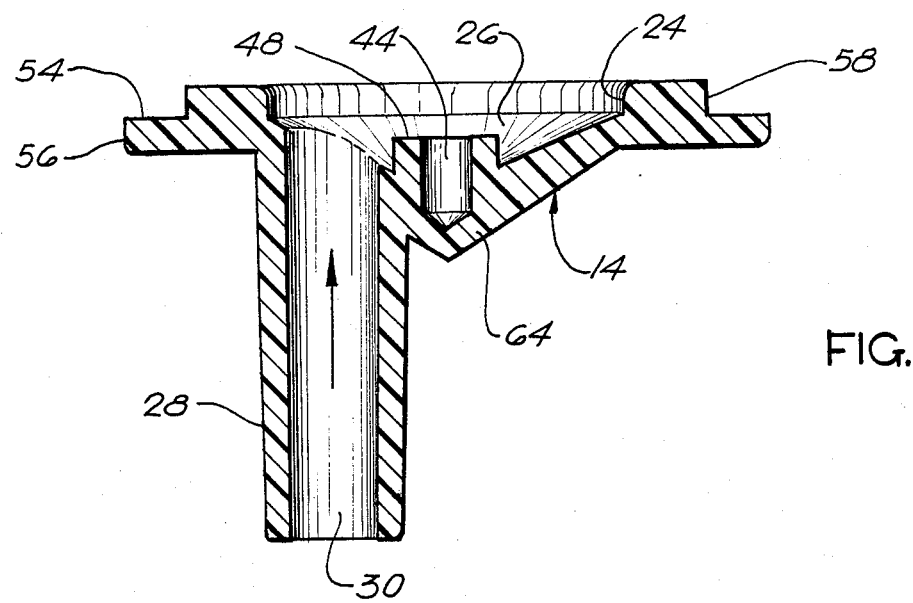
FIG. 3 is a central longitudinal section taken through the lower valve member of the valve shown in FIG. 1.

As shown in FIG. 3, the inlet body member 14 has an internal annular valve seat 24 which surrounds an inlet cavity 26, formed in the inlet body member 14. A tubular inlet connection 28 is formed in one piece with the inlet body member 14. An inlet passage 30 extends within the tubular inlet connection 28 and communicates with the inlet cavity 26.

Figure 2:
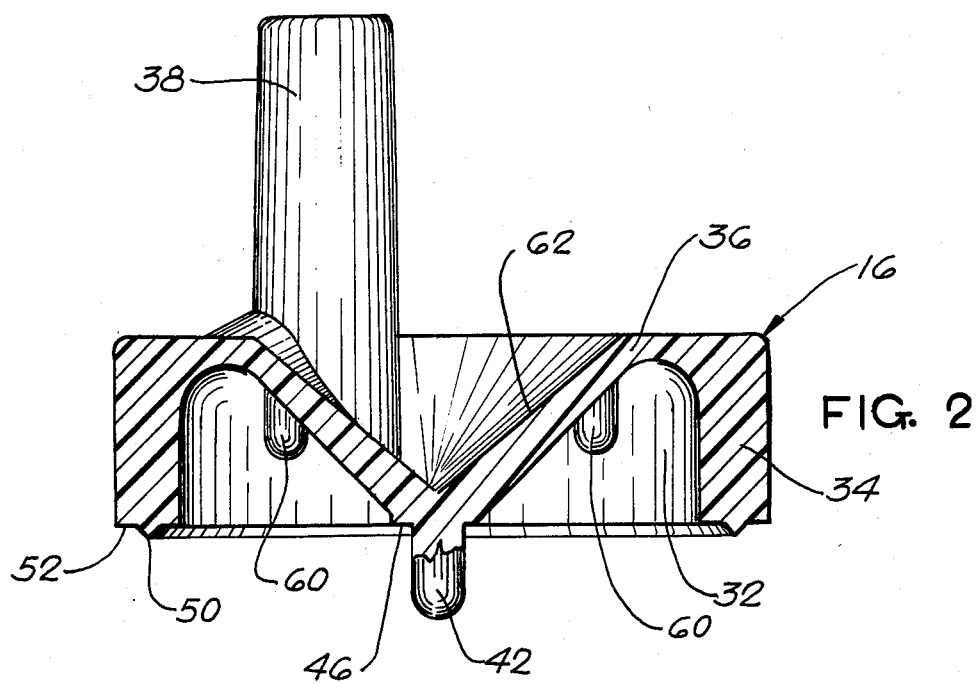
FIG. 2 is a fragmentary longitudinal section taken though the upper valve member of the valve shown in FIG. 1.

As shown in FIGS. 1 and 2, the outlet body member 16 is formed with an outlet chamber 32 which is surrounded by a cylindrical wall 34. The outlet chamber 32 opens downwardly, as shown in FIGS. 1 and 2, toward the inlet body member 14 and also toward the valve disc 20. The outlet member 16 has an end wall 36 at the upper end of the outlet chamber 32.

A tubular outlet connection 38 is formed in one piece with the outlet body member 16. Within the tubular outlet connection 38, there is an outlet passage 40 which communicates with the outlet chamber 32.

The body members 14 and 16 have mating pin and socket formations which are axially disposed, relative to the annular seat 24 and the cylindrical wall 34. In this case, the outlet body member 16 is formed with the pin formation 42, while the inlet body member 14 is formed with the socket formation 44. However, this situation could be reversed. Annular shoulders 46 and 48 are formed around the pin formation 42 and the socket formation 44. Thus, the annular shoulder 46 is on the outlet body member 16, while the annular shoulder 48 is on the inlet body member 14. The shoulders 46 and 48 are in the form of flat annular surfaces which are in radial planes. The annular shoulders 46 and 48 confront each other and are closely spaced apart, when the valve members 14 and 16 are assembled, as shown in FIG. 1.

In the assembly of the valve 10, the pin formation 42 is inserted through the central locating hole 22 in the flat valve disc 20, until the annular shoulder 46 engages the upper side of the valve disc 20. Preferably, the diameter of the hole 22 is slightly less than the diameter of the pin formation 42, so that there is an interference fit insuring a tight seal between the pin formation 42 and the portion of the valve disc 20 around the hole 22. The interference fit also insures that the valve disc 20 will be retained on the pin formation 42, during the remainder of the assembly procedure. Without the frictional retention afforded by the interference fit, the valve disc 20 might easily become dislodged from the pin formation 42.

The assembly of the valve 10 is completed by inserting the pin formation 42 into the socket formation 44, and by bonding the body members 14 and 16 together, as by the formation of the annular weld 18. To assist in the formation of the weld 18, the outlet body member 16 is initially formed with an annular ridge 50, projecting endwise and downwardly from an annular radial end surface 52, on the lower end of the cylindrical wall 34 of the outlet valve member 16. The annular ridge 50 is adapted to engage an annular radial surface 54, projecting upwardly on a peripheral flange portion 56 of the inlet valve mamber 14, which also has an upwardly projecting cylindrical portion 58, received and located within the cylindrical wall 34 of the outlet valve member 16.

The weld 18 may be completed by applying pressure and ultrasonic vibratory energy between the inlet and outlet body members 14 and 16. The ridge 50 concentrates the ultrasonic vibratory energy, so that it causes the ridge 50 to be heated sufficiently to flow between the confronting radial surfaces 52 and 54, thereby completing the weld 18. As shown, the ridge 50 is V-shaped in cross-section, so that the ridge 50 tapers to a crest line which engages the radial surface 54, prior to the completion of the weld 18. As the weld 18 is formed by the ultrasonic vibratory energy, the ridge 50 essentially disappears, because the ridge is converted into molten material by ultrasonic energy, and such molten material flows between the surfaces 52 and 54 and becomes unified with both surfaces. The ridge could be formed on the inlet body member 14. Moreover, a variety of other continuous joint sealing configurations could be used between the body members 14 and 16.

It will be seen from FIGS. 1 and 3 that the socket formation 44 and the annular shoulder 48 are recessed into the inlet cavity 26, formed in the inlet body member 14. Thus, the shouler 48 is recessed downwardly to a level substantially below the level of the annular valve seat 24.

When the valve 10 is assembled, as shown in FIG. 1, the central portion of the valve disc 20 is retained or lightly clamped between the shoulders 46 and 48 on the body members 16 and 14, respectively. As assembled, the pin formation 42 and the shoulder 46 are also recessed into the inlet cavity 26. As the pin formation 42 is inserted into the socket formation 44, during the assembly of the valve 10, the valve disc 20 engages the annular valve seat 24 and then is deflected into a cupped shape, as the assembly of the valve 10 is completed. The resilience or elasticity of the valve disc 20 causes it to be biased into sealing engagement with the annular valve seat 24. Thus, the valve disc 20 is biased by its own resilience into its closed position, with the outer portion of the disc 20 in sealing engagement with the annular valve seat 24.

It will be evident that the resilient valve disc 20 prevents any reverse flow of fluid between the outlet passage 40 and the inlet passage 30. Thus, the valve 10 is well adapted to serve as a check valve. The inlet cavity 26 has a shallow configuration to support the valve disc 20 so that it will not herniate when subjected to back pressure, but will remain in sealing engagement with the valve seat 24.

It is possible for a fluid to flow between the inlet passage 30 and the outlet passage 40, if a small differential fluid pressure is developed between the passages 30 and 40. The differential fluid pressure causes the valve disc 20 to deflect away from the annular valve seat 24, so as to open an annular space therebetween, through which fluid can flow between the inlet cavity 26 and the outlet chamber 32. The open or upwardly deflected position of the valve disc 20 is shown in broken lines in FIG. 1.

Because a small differential fluid pressure is required to unseat the resilient valve disc 20 from the annular valve seat 24, the valve 10 is well adapted to serve as a pressure relief valve, for relieving differential fluid pressure between the inlet and outlet passages 30 and 40. If the pressure in the outlet passage 40 is subatmospheric, so that a partial vacuum exists in the outlet passage 40, the valve 10 is adapted to serve as a vacuum relief valve.

The relief or cracking pressure differential, at which the valve disc 20 is deflected away from the annular valve seat 24, is determined by the resilience or elasticity of the disc 20. The resilience depends upon the thickness of the valve disc 20 and the characteristics of the material employed in the valve disc, as to flexibility and resilience. The pressure differential required to open the valve may be varied, but typically is on the order of 3 to 12 inches of water. Stated in terms of pounds per square inch, this range is on the order of 0.007 to 0.03 psi.

The outlet valve member 16 is preferably formed with stop means, such as the illustrated stop pins 60, for limiting the opening movement of the valve disc 20, so as to prevent any obstruction of the outlet passage 40 by the valve disc. As shown, the outlet body member 16 is formed with five of the pins 60, projecting downwardly into the outlet cavity 32, toward the valve disc 20, and spaced upwardly from the closed position of the valve disc. The stop means might assume various other forms.

The positioning of the inlet and outlet connections 28 and 38 is unique, in that both connections 28 and 38 are offset outwardly in a radial direction, from the central axis of the valve 10. On the other hand, the pin and socket formations 42 and 44 are coaxial with the central axis as are the valve disc 20, the annular valve seat 24, the cylindrical wall 34 and the flange 56. The tubular inlet and outlet connections 28 and 38 are aligned with each other, but are offset a considerable distance in a radial direction from the central axis of the valve 10.

The upper end wall 36 of the outlet body member 16 has a downwardly projecting, generally conical central portion 62, from which the pin formation 42 projects downwardly. On the inlet body member 14, the socket formation 44 is formed as part of a central, downwardly projecting, generally conical end wall portion 64. The inlet connection 28 merges into the end wall portion 64.

The outlet connection 38 has a flaring portion 66 which merges smoothly into the upper end wall 36 and also into the cone-shaped portion 62. This construction forms a smooth channel 68 which avoids turbulence in the fluid as it flows from the inlet passage 30, through the inlet cavity 26, between the valve disc 20 and the seat 24, through the outlet chamber 32 and the channel 68, and into the outlet passage 40.

This offset positioning of the tubular inlet and outlet connections 28 and 38 is highly advantageous. With this construction, the inlet and outlet passages 30 and 40 are opposite the outer portion of the valve disc 20, in one particular location around the circumference of the disc, so that the valve disc 20 cracks open more easily in response to any surge of differential pressure between the inlet and outlet passages. The valve disc 20 starts to unseat or crack open from the annular valve seat 24 in the location which is opposite the aligned inlet and outlet passages 30 and 40. As the flow increases through the valve 10, the entire valve disc 20 is unseated from the annular valve seat 24. The alignment of the inlet and outlet passages 30 and 40 affords a short path length therebetween so as to assist in avoiding turbulence in the fluid flow through the valve 10.

Moreoever, the offset positioning of the inlet and outlet connections 28 and 38 facilitates the molding of the body members 14 and 16, because the construction of the mold is simplified by offsetting the inlet and outlet connections 28 and 38 from the pin and socket formations 42 and 44. The construction of the body members 14 and 16 is actually simpler when the inlet and outlet connections 28 and 38 are offset from the pin and socket formations 42 and 44.

The valve 10 has the additional advantage that it is not position sensitive. Thus, the valve 10 operates equally well in any position. The use of the terms upper and lower in the preceding description is merely a matter of convenience and does not limit the valve to use in any particular position.

The valve 10 is extremely compact and reliable in operation, while also being easy to manufacture and low in cost. The valve 10 is well adapted for assembly by automatic machinery, because the valve disc 20 can readily be assembled on the pin formation 42 by automatic means, following which the inlet and outlet body members 14 and 16 can readily be assembled and welded together by automatic means.

I claim:

1. A valve for relieving pressure or checking reverse flow, such valve comprising a valve body including first and second mating body members which are generally circular in cross-section, the first body member having an inlet cavity with an annular valve seat surrounding the cavity, the body members having mating pin and socket formations disposed axially thereon, a flexible resilient valve disc having a central opening for sealingly receiving the pin formation whereby the pin formation retains the valve disc, the valve disc having an outer portion which initially is in sealing engagement with the annular valve seat, the body members having annular shoulder means around the pin and socket formations for engaging the valve disc, the annular shoulder means being recessed into the inlet cavity for deflecting the valve disc into a cupped shape whereby the central portion of the valve disc is deflected into the inlet cavity while the outer portion of the valve disc is resiliently biased against the annular valve seat, the second body member having an outlet chamber therein for receiving the valve disc, a tubular inlet connection on the first body member and forming an inlet passage communicating with the inlet cavity, the tubular inlet connection being offset in a radially outward direction from the axial pin and socket formations, and a tubular outlet connection on the second body member and forming an outlet passage communicating with the outlet chamber, the tubular outlet connection being offset in a radially outward direction from the axial pin and socket formations and being aligned with the tubular inlet formation.

2. A valve according to claim 1, including stop means on the second body member and projecting into the outlet chamber toward the valve disc for arresting the deflection of the valve disc to prevent the valve disc from obstructing the outlet passage.

3. A valve according to claim 2, such stop means including pin elements projecting into the outlet chamber.

4. A valve according to claim 1, in which the valve disc is made of a thin silicone elastomer material.

5. A valve according to claim 1, in which the body members are made of a resinous plastic material and are bonded together.

6. A valve according to claim 1, in which the body members are made of a resinous plastic material and are bonded together by an ultrasonically formed weld.

7. A valve according to claim 1, in which the central opening in the valve disc is of a size to establish an interference fit with the pin formation, whereby the valve disc is securely retained on the pin formation during the assembly of the body members.

8. A valve for relieving pressure or checking reverse flow, such valve comprising a valve body including first and second mating body members which are generally circular in cross-section, the first body member having an inlet cavity with an annular valve seat surrounding the cavity, the body members having mating pin and socket formations disposed axially thereon, a flexible resilient valve disc having a central opening for sealingly receiving the pin formation whereby the pin formation retains the valve disc, the valve disc having an outer portion which initially is in sealing engagement with the annular valve seat, the body members having annular shoulder means around the pin and socket formations for engaging the valve disc, the annular shoulder means being recessed into the inlet cavity for deflecting the valve disc into a cupped shape whereby the central portion of the valve disc is deflected into the inlet cavity while the outer portion of the valve disc is resiliently biased against the annular valve seat, the second body member having an outlet chamber therein for receiving the valve disc, a tubular inlet connection on the first body member and forming an inlet passage communicating with the inlet cavity, the tubular inlet connection being offset in a radially outward direction from the axial pin and socket formations, and a tubular outlet connection on the second body member and forming an outlet passage communicating with the outlet chamber, the tubular outlet connection being offset in a radially outward direction from the axial pin and socket formations and being aligned with the tubular inlet formation, the flexible resilient disc being resiliently flexible away from the annular valve seat and into the outlet chamber by differential fluid pressure between the inlet cavity and the outlet chamber, the valve disc being made of a thin silicone elastomer material, the central opening in the valve disc being of a size to establish an interference fit with the pin formation, whereby the valve disc is securely retained on the pin formation during assembly of the body members, the body members being made of resinous plastic materials bonded together.

9. A valve according to claim 8, in which the pin formation is on the second body member, the socket formation being on the first body member, the annular shoulder means including oppositely facing annular shoulders disposed around the pin formation and the socket formation and engaging opposite sides of the valve disc.

10. A valve according to claim 8, including stop elements on the second body member and projecting into the outlet chamber toward the valve disc for arresting the deflection of the valve disc to prevent the valve disc from obstructing the outlet passage.

11. A valve according to claim 10, in which the stop elements are in the shape of pins projecting into the outlet chamber.

12. A valve according to claim 1, in which the tubular outlet connection has a portion merging smoothly with the outlet body member and forming a smooth channel extending from the outlet chamber into the outlet passage to avoid turbulence in fluid flow.

13. A valve according to claim 1, in which the aligned inlet and outlet connections merge smoothly with the inlet and outlet body members and provide a short flow path between the inlet and outlet passages.

14. A valve according to claim 1, in which the inlet cavity has a shallow configuration relative to the valve disc for supporting the disc against excessive deformation by back pressure to maintain the disc in sealing engagement with the valve seat.

* * * * *